(12) United States Patent
Hsu

(10) Patent No.: US 8,360,519 B1
(45) Date of Patent: Jan. 29, 2013

(54) TEMPORARY SEAT-TOP STORAGE DEVICE

(76) Inventor: Wei K. Hsu, Garland, TX (US)

( * ) Notice: Subject to any disclaimer, the term of this patent is extended or adjusted under 35 U.S.C. 154(b) by 0 days.

(21) Appl. No.: 13/358,704

(22) Filed: Jan. 26, 2012

Related U.S. Application Data

(63) Continuation of application No. PCT/US2011/065597, filed on Dec. 16, 2011.

(60) Provisional application No. 61/560,622, filed on Nov. 16, 2011, provisional application No. 61/536,931, filed on Sep. 20, 2011.

(51) Int. Cl.
*A47C 7/62* (2006.01)

(52) U.S. Cl. .................. 297/188.01; 297/182; 224/275

(58) Field of Classification Search ............... 297/182, 297/188.01; 224/275
See application file for complete search history.

(56) References Cited

U.S. PATENT DOCUMENTS

| | | | |
|---|---|---|---|
| 2,531,096 A * | 11/1950 | Allers | 224/275 |
| 5,125,121 A | 6/1992 | Wroble | |
| 5,161,854 A | 11/1992 | Yokoto et al. | |
| 5,354,119 A | 10/1994 | Nicholas | |
| 5,383,727 A | 1/1995 | Rife | |
| 5,549,353 A | 8/1996 | Gaudet et al. | |
| 6,079,773 A * | 6/2000 | Hassan | 297/188.04 |
| 6,276,582 B1 * | 8/2001 | Alexander | 224/275 |
| 7,309,102 B1 * | 12/2007 | Davis | 297/182 X |
| 7,311,356 B2 * | 12/2007 | Pudney | 297/188.01 X |
| 7,422,278 B2 * | 9/2008 | McConnell et al. | 297/182 |
| 7,527,314 B2 | 5/2009 | Dohan | |
| 7,681,292 B2 | 3/2010 | McConnell et al. | |
| 7,758,090 B2 | 7/2010 | Gregory | |
| 8,042,241 B2 | 10/2011 | McConnell et al. | |
| 8,162,189 B2 | 4/2012 | Robins | |
| 2002/0167214 A1 | 11/2002 | Nelson et al. | |
| 2003/0205921 A1 | 11/2003 | McConnell et al. | |
| 2006/0049674 A1 | 3/2006 | Fair | |
| 2006/0082196 A1 | 4/2006 | McConnell et al. | |
| 2007/0241581 A1 | 10/2007 | Martin | |
| 2010/0187869 A1 | 7/2010 | McConnell et al. | |
| 2010/0231010 A1 | 9/2010 | Manley | |
| 2012/0038189 A1 | 2/2012 | McConnell et al. | |

FOREIGN PATENT DOCUMENTS

JP 2006-025842 A 2/2006

* cited by examiner

*Primary Examiner* — Anthony D Barfield

(74) *Attorney, Agent, or Firm* — Grady K. Bergen; Griggs Bergen LLP

(57) ABSTRACT

A seat, seat cover and wall subassembly for installation into the upholstery of a vehicle seat or an after-market seat cover is disclosed. The invention is particularly advantages for use on a vehicle seat and provides a means of containment of items on the seat of a vehicle during transport.

10 Claims, 6 Drawing Sheets

TEMPORARY SEAT-TOP STORAGE DEVICE

CROSS REFERENCE TO RELATED APPLICATIONS

This application is a continuation of PCT patent application No. PCT/US11/65597, filed Dec. 16, 2011, which claims the benefit of U.S. provisional applications 61/560,622 filed Nov. 16, 2011 and 61/536,931 filed Sep. 20, 2011.

STATEMENT REGARDING FEDERALLY SPONSORED RESEARCH OR DEVELOPMENT

Not applicable.

TECHNICAL FIELD

This invention relates to the field of seat covers and seat accessories, particularly for vehicles.

BACKGROUND

Many vehicle drivers prefer to use the passenger seat of their car to temporarily place objects such as letters, handbags, cellular phones, books, take-out food containers and bags, and small boxes. When objects are placed on the passenger seat of a vehicle, such objects often fall onto the floor in front of the passenger seat. This occurs, for instance, when the driver applies the brake or accelerates. Small items such as pens, cards, and combs, are likely to slip to the side of the seat in places where the items are hard to retrieve. This is particularly a problem with seats made of leather and imitation leather which have a somewhat slick surface. Computers and other delicate items are likely to be damaged during the fall from the seat to the floor.

DETAILED DESCRIPTION

An apparatus for temporary seat-top storage is disclosed. In a first embodiment, said apparatus is a wall subassembly in an after-market seat cover. In a second embodiment, said wall subassembly is disclosed. The wall subassembly may be incorporated by a manufacturer or upholsterer into upholstery of a seat or an after-market seat cover. The features of said apparatus are detailed in the following paragraphs.

Figure 1:
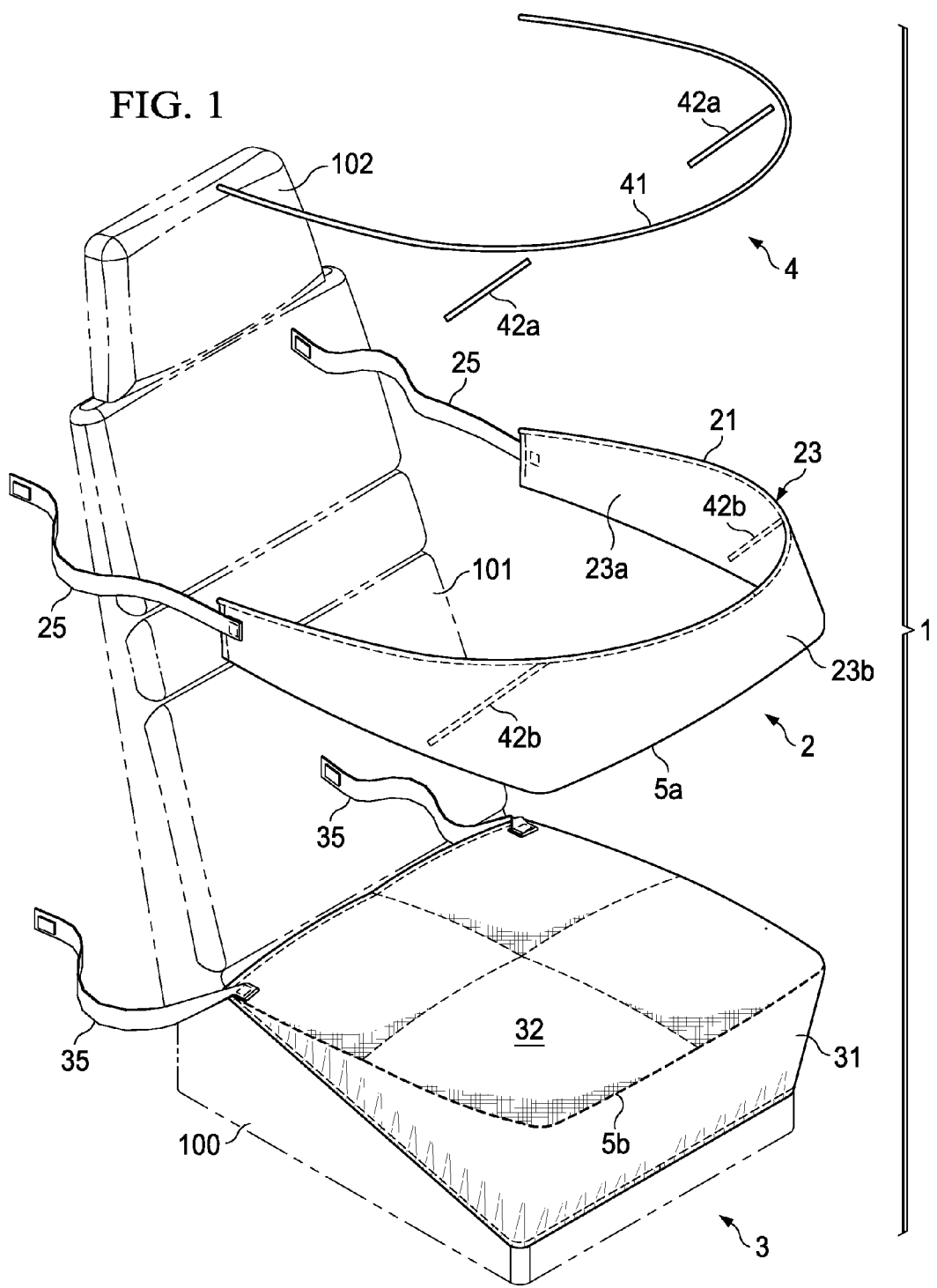
FIG. 1 is a front perspective exploded view of an embodiment of the invention and a typical automobile seat.
Figure 2:
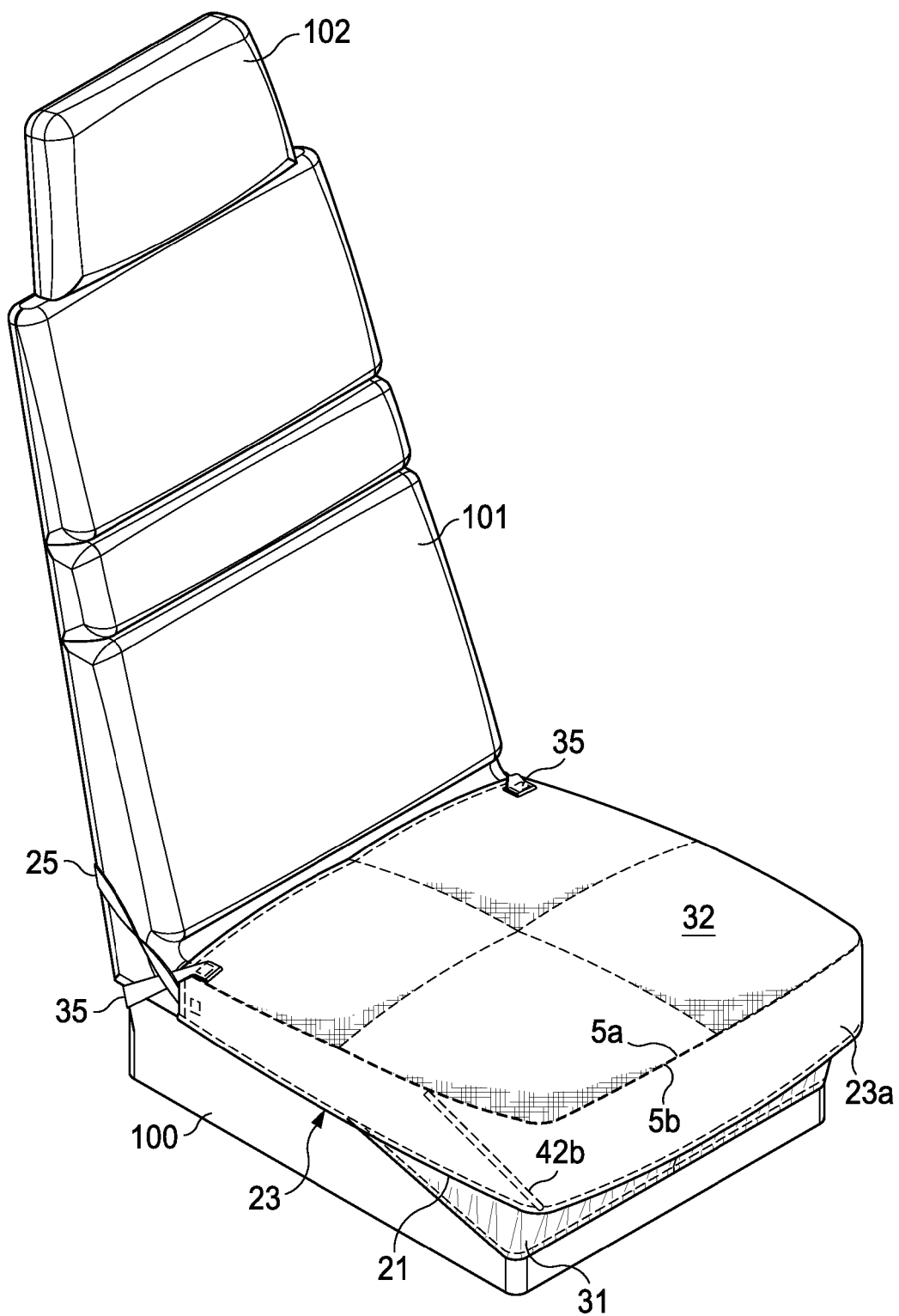
FIG. 2 is a front perspective view of an embodiment of the invention and a typical automobile seat with the wall of the device in a flipped down, rest position.

Referring to FIG. 1, an embodiment of the seat top storage device 1 is shown in exploded view to illustrate its various parts. The embodiment shown comprises a wall 2, a seat cover portion 3, and a wall support 4. Seat cover portion 3 comprises a cover section 31, middle section 32, and seat straps 35. Wall 2 comprises a wall material 23 and wall straps 25. Wall support 4 comprises a wire 41 and preferably one or more side supports 42a. Preferably, at least two side supports are employed. Wire 41 is incorporated into wall 2 at upper edge 21 thereof. Preferably a casing for wire 41 is formed by stitching as shown. Side supports 42a are incorporated into wall 2 at side support areas 42b shown in phantom. In one embodiment, the wall selvage 5a is sewn into a seat cover seam 5b, as best seen in FIG. 2. In such case, the seat cover can be installed onto the vehicle seat. The wall 2 of the seat cover has a first flipped-down (rest) position and a second flipped-up (active) position. At rest, the seat cover middle section 32 may be sat upon by a vehicle occupant. However, when flipped up, the middle section 32 provides the surface onto which objects may be placed thereby.

Figure 3:
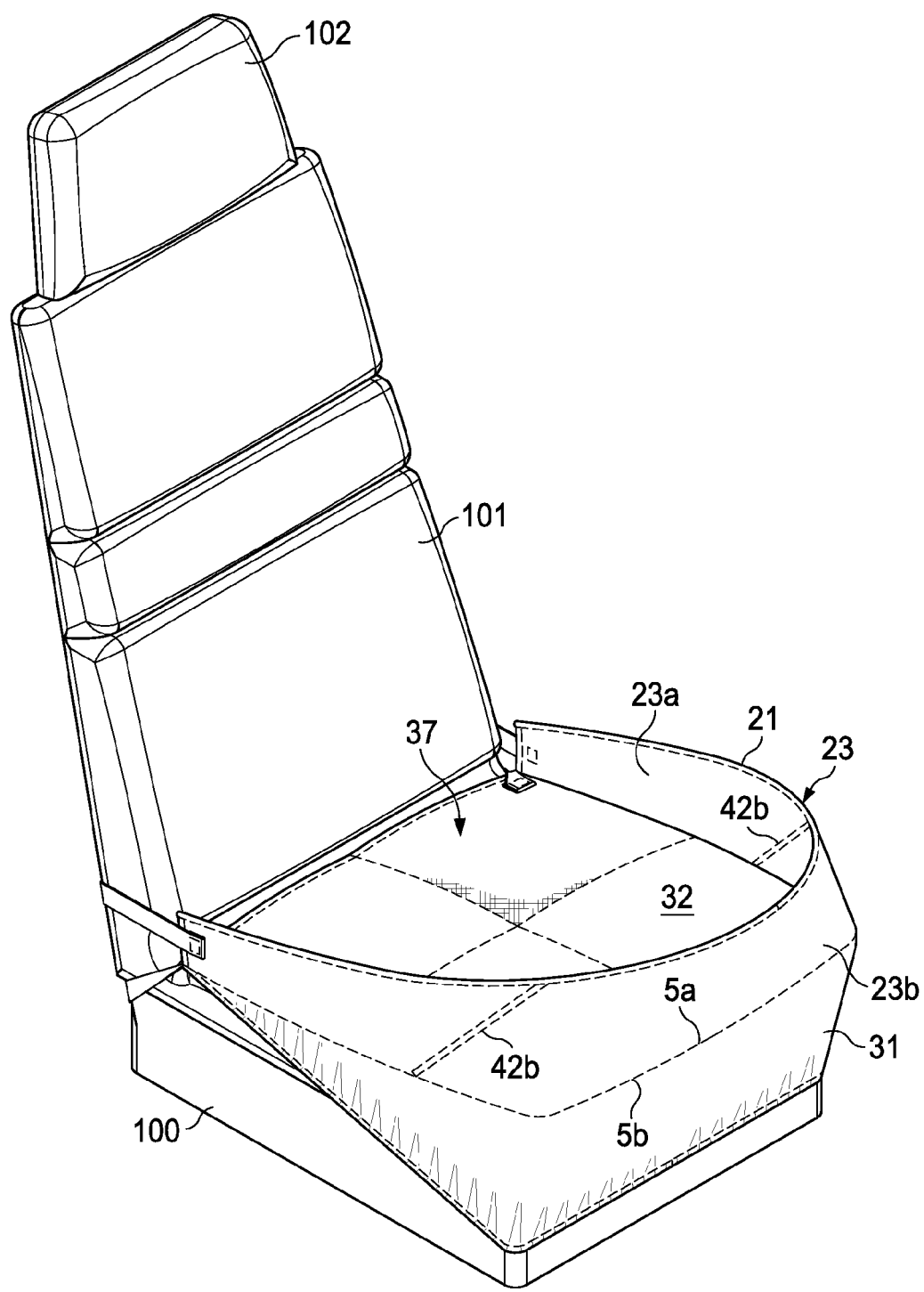
FIG. 3 is a front perspective view of an embodiment of the invention and a typical automobile seat with wall of the device in a flipped up, active position.
Figure 4:
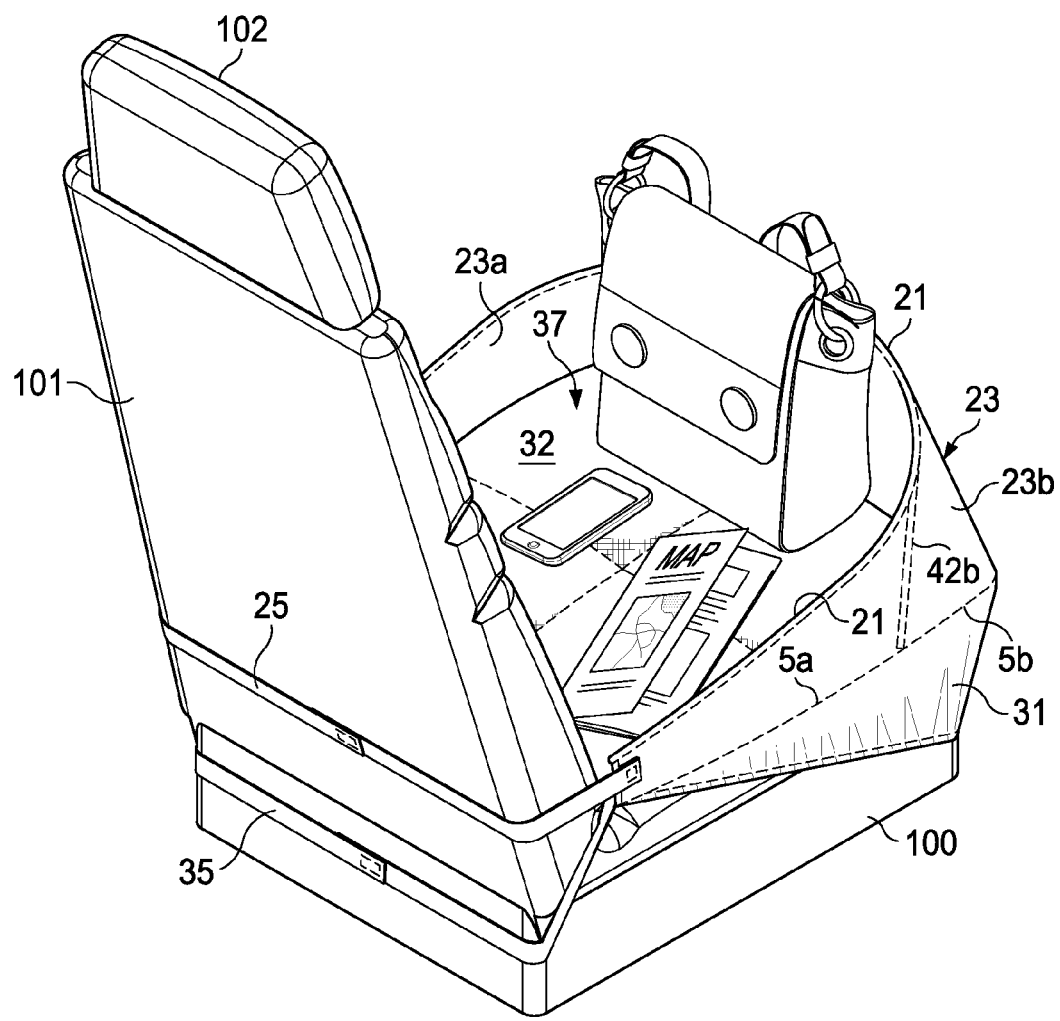
FIG. 4 is a back perspective environmental view of an embodiment of the invention in an active position and a typical automobile seat with items placed within a walled area provided by the device.
Figure 5:
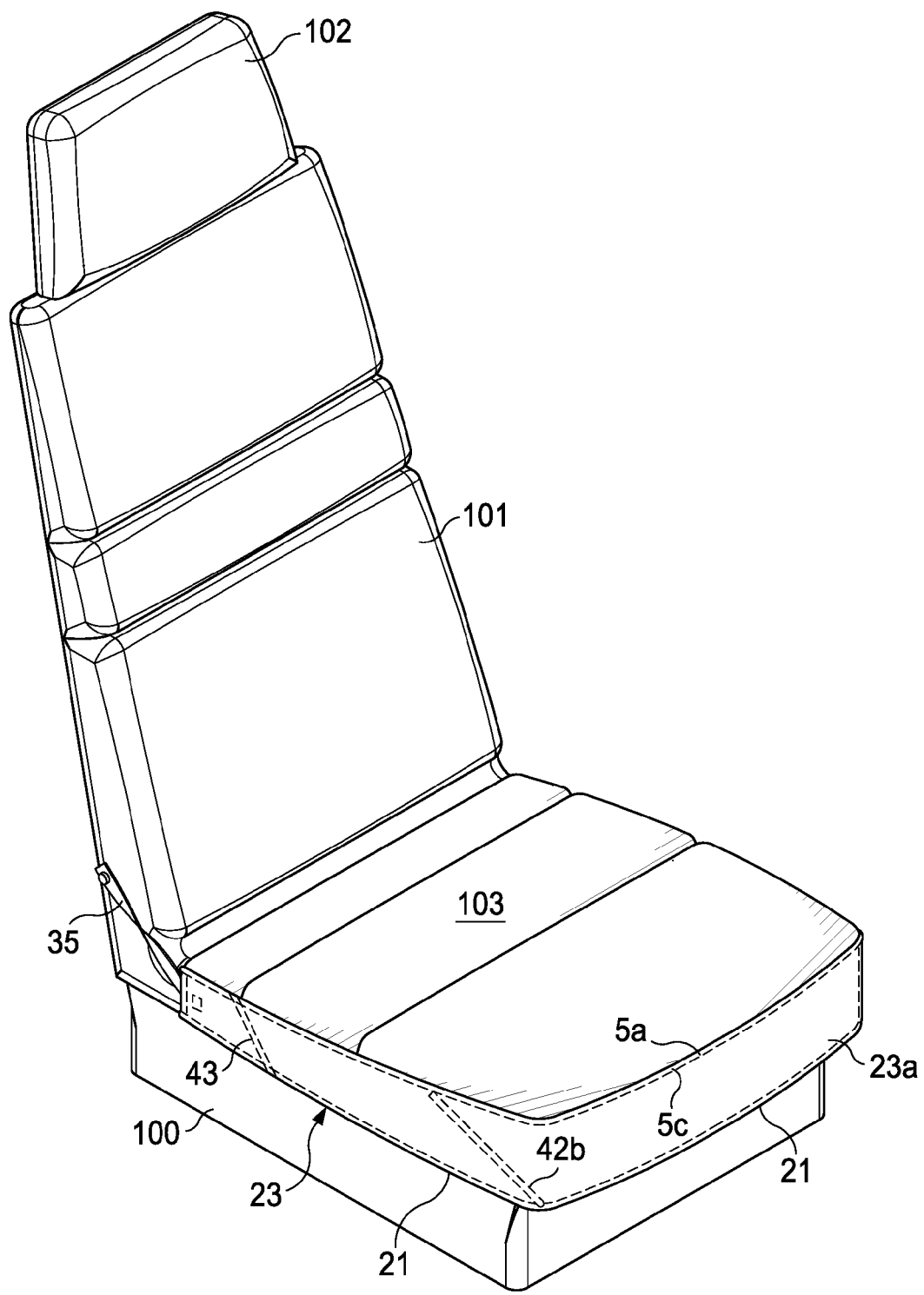
FIG. 5 is a front perspective view of another embodiment of the invention incorporated into a typical automobile seat upholstery with the wall flipped down.
Figure 6:
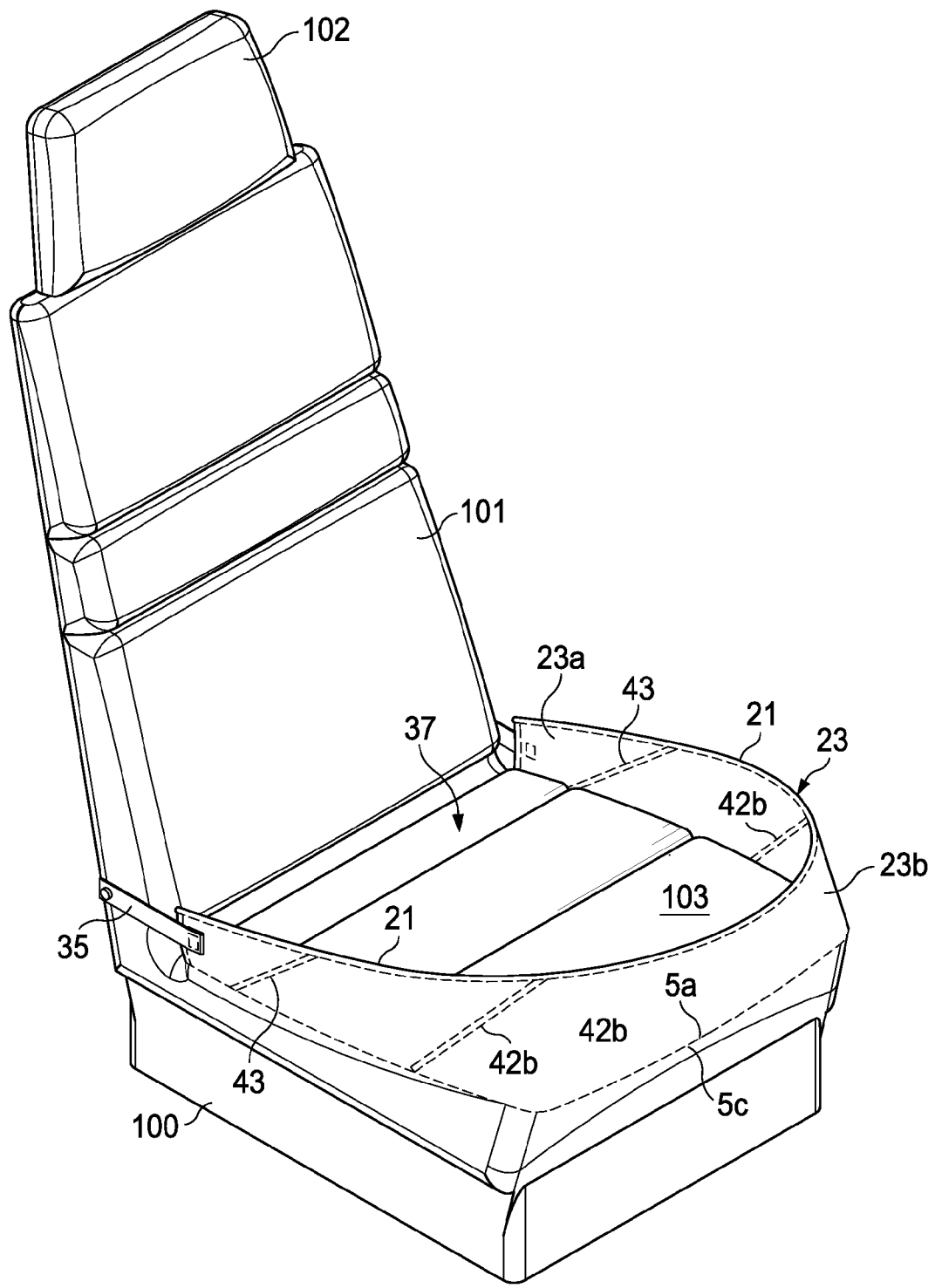
FIG. 6 is a front perspective view of the embodiment of the invention in FIG. 5 as incorporated into a typical automobile seat, with the wall flipped up to create a walled area.

As best shown in FIG. 1, steel wire 41 is sewn along the upper edge 21 of the wall 2. Wall straps 25 are two additional straps which are optional but preferred. They function to maintain the upper edge 21 of the wall 2 in a flipped-up position (as seen in FIGS. 3, 4, and 6), or when the wall 2 is in flipped-down position, the wall straps 25 pull the upper edge 21 tight against the seat (as seen in FIGS. 2 and 5). Wall straps 25 may fasten together after going around the seat. Alternatively, a complementary fastener may be installed on the seat back or side for securement of wall strap 25 to the seat. Side supports 42a are wire supports to maintain the wall 2 upright when in use. Wire supports 42a will lie adjacent and "hug" the seat when the wall 2 is flipped down. As stated above, additional side supports 42a may optionally be employed in the wall 2. Casings may be provided as illustrated (side support area 42b) by stitching two layers of wall material 23 together or by stitching or gluing a fabric to wall material 23.

Wall 2 is flipped down when the passenger or other seat is to be used by a passenger and does not interfere with any safety apparatuses of the seat nor cause discomfort to the passenger. When in use, as shown in FIG. 4, wall 2 is flipped up. Wire 41 and steel side supports 42a maintain wall 2 in a flipped-up, upright position. Any items placed in walled area 37 thereby formed on the passenger seat are restrained from falling off the seat.

FIGS. 5 and 6 are a second embodiment of the invention in which a wall 2 is incorporated into the upholstery of a vehicle seat. Upholstery sitting area 103 has a seat seam 5c. Said seat seam 5c secures to wall selvage 5a of wall 2 to create a joined seam. Upper edge 21 defines the top of wall 2. Spring wire 41 and side supports 42a help wall 2 retain its shape. When wall 2 is in the upright position, wall 2 and middle section 32 define a walled area 37. Wall straps 25, which provide support for wall 2 may also be secured to the upholstery as seen in FIG. 5.

Wall 2 as shown in FIG. 1, with wire 41 and wire supports 42a incorporated therein, may be provided as a subassembly component to manufacturers of after-market seat covers or to upholsters of vehicle seats. As seen in FIGS. 5 and 6, the subcomponent may be installed permanently into the upholstery of a vehicle seat by stitching or gluing selvage 5a into a seat seam 5c of the upholstery or otherwise attached thereto. When the selvage is stitched into seam 5c, it lies adjacent the side sections of seat bottom 100 and upholstery sitting area 103 as best seen in FIG. 5 with wall 2 in a first flipped-down position. Wall 2 can be flipped up to a second flipped-up position as best seen in FIG. 6, whereby a walled area 37 is formed on the seat. Small objects can be placed on the seat in walled area 37, whereby wall 2 will prevent such objects from falling onto the floor of the vehicle or to the right or left of the seat.

In still another embodiment, wall 2 may be secured to upholstery by the use of fastening means instead of being stitched into a seam of seat upholstery. Such fastening means include, for example, hook and loop fasteners, snaps, zippers, and tacks. Other fastening means may also be suitable as long as wall 2 is capable of being transitioned from a first flipped-down position to a second flipped-up position and back.

Another embodiment may comprise a seat cover having a wall as described above, and further comprising a seat cover portion that covers seat back 101.

Wall 2 of the invention comprises a single section or multiple sections of a fabric or fabric-like material. Preferably, wall 2 is formed of two layers of fabric, an outer fabric and an inner fabric each having 2 long selvage edges and 2 short selvage edges, which layers are secured together by stitching, gluing or bonding along the respective selvage edges thereof. Most preferably, the selvage edges are hidden as is conventional in sewing technique so that a finished seam is visible to the user. The first long selvage edges are a part of the seam shown at upper edge 21 in FIG. 1 and the second long selvage edges (wall selvage 5a) are a part of seam 5b as best seen in FIG. 2 or seam 5c as best seen in FIG. 5. Wire 41 is inserted in a casing formed by stitching near upper edge 21. Side support areas 42b may be formed by stitching through the two layers or by addition of another fabric strip in the desired area which is stitched, glued or otherwise secured onto wall 2 to form side support areas 42b which are adapted to receive side supports 42a.

The multiple section embodiment preferably comprise two back sections, two mid sections, and a front section, each shaped so as to conform to the configuration of the vehicle seat of interest. Each of said sections has a wall selvage 5a and an upper selvage edge. Each of said midsections has a back side seam secured to said back section and front side seam secured to said front section. Side supports 42a may be secured along each of said side seams, or at least along said front side seam. A casing is formed at said upper edge 21, preferably by stitching, and wire 41 inserted in said casing along said upper edge.

Wire 41 can be any metal, plastic or other material which can support the wall and maintain the desired structure when the wall is flipped up or flipped down as illustrated in the drawings. As just one example, wire 41 may be a flat steel wire of approximate dimensions 1/16 by 1/32 inches (0.16 cm by 0.08 cm). Other dimensions can be used as long as the properties of the wire 41 permit the functions shown. High carbon steel, extruded nylon and polypropylene are examples of suitable materials. Side supports 42a may be of similar or different material. Although two are illustrated, additional or fewer side supports 42a may be utilized.

The wall of the invention may be integrated into the upholstery of any seat, and into seat covers for vehicle seats and similarly dimensioned seats and chairs. While it is envisioned to be particularly useful in the front passenger seat of a vehicle, rear van seats, boat seats, and many other seats may benefit from use of this invention.

I claim:

1. A seat cover of a vehicle seat, comprising:
   a. a middle section for covering an upper seating surface of the vehicle seat;
   b. a cover section attached to said middle section that is configured for covering the front and lateral sides of the vehicle seat;
   c. a wall having a free upper edge and an opposite wall selvage edge, said wall selvage edge secured to said middle section; said upper edge having an enclosed casing adapted to receive a wire, and one or more side support areas;
   d. said wall having a wire inserted in said casing, said wire extending solely along the length of said upper edge without directly coupling the wire to the vehicle seat; and
   e. one or more side supports incorporated into said side support area of said wall;
   whereby when said seat cover is installed on a seat, said wall has a first flipped-down position and a second flipped up position, whereby in said second flipped up position a walled area is formed.

2. The seat cover of claim 1, further comprising one or more straps secured to said seat cover for securing said seat cover to a seat.

3. The seat cover of claim 1 further comprising one or more straps having a first edge secured to said wall and a second edge which is attachable to a seat when said wall is in a flipped up position.

4. The seat cover of claim 1, further comprising an enclosed casing in said side support area adapted to receive said side supports.

5. The seat cover of claim 4, wherein said casings are formed by affixing an additional fabric portion to said side support area.

6. The seat cover of claim 1, wherein said wire is comprised of a wire material which can support the wall and maintain the wall in a first upright position for a time frame desired by a user.

7. The seat cover of claim 1, further comprising a seat cover portion adapted to cover a seat back.

8. A seat for a vehicle, comprising a seat having a seat bottom, a seat back and an upholstery sitting area, said seat further comprising an upholstery which is secured to said seat, said upholstery further comprising a wall having a free upper edge and an opposite lower edge that is secured solely to the outer perimeter of the upholstery sitting area of said seat bottom, said wall having a first flipped up position and a first flipped down position, whereby when said wall is in said second flipped up position, a walled area is formed adjacent said upholstery sitting area for temporary storage of objects and whereby when said wall is in said first flipped down position, said upholstery sitting area is adapted to receive a passenger wherein said wall comprises: a. a fabric having a lower edge, which lower edge is attached permanently to a seam of said upholstery, and an upper edge having a casing adapted to receive a wire; b. a wire inserted into said casing that extends solely along the length of said upper edge; and c. one or more side supports incorporated into a side support area of said fabric.

9. The seat of claim 8, wherein said casings are formed by affixing an additional fabric portion to said side support area.

10. The seat cover of claim 8, wherein said wire is comprised of a wire material which can support the wall and maintain the wall in a first upright position for a time frame desired by a user.

* * * * *